United States Patent [19]

Menshen

[11] 4,262,869
[45] Apr. 21, 1981

[54] CLAMP FOR ELONGATED CYLINDRICAL WORKPIECE

[75] Inventor: Arnold Menshen, Neuenrade, Fed. Rep. of Germany

[73] Assignee: Walter Stauffenberg KG, Fed. Rep. of Germany

[21] Appl. No.: 6,642

[22] Filed: Jan. 26, 1979

[30] Foreign Application Priority Data

Oct. 23, 1978 [DE] Fed. Rep. of Germany ... 7831579[U]

[51] Int. Cl.³ .............................................. F16L 3/10
[52] U.S. Cl. ................................ 248/74 R; 248/632; 248/634
[58] Field of Search ............... 248/74 R, 74 A, 74 B, 248/613, 632, 634

[56] References Cited

U.S. PATENT DOCUMENTS

| | | | |
|---|---|---|---|
| 2,365,985 | 12/1944 | West | 248/74 R |
| 2,937,835 | 5/1960 | Csmerka | 248/74 R |
| 3,161,721 | 12/1964 | Torr | 248/74 R X |
| 3,564,676 | 2/1971 | Oeser | 248/74 R |
| 3,565,374 | 2/1971 | Jones | 248/74 R |

Primary Examiner—Roy D. Frazier
Attorney, Agent, or Firm—Carella, Bain, Gilfillan & Rhodes

[57] ABSTRACT

A clamp for an elongated cylindrical workpiece such as a hose or pipe, comprises two, substantially identical, clamp members each having a semi-cylindrical recess formed therein. A cylindrical elastic insert is fitted around the workpiece and then inserted into the circular recess formed when the two clamp members are fastened one to the other. In the axial direction, the elastic insert has an elevated central region which engages a similar, depressed central region in the cylindrical recess formed by two clamp members. The height of the depressed region is less than the height of the elevated region; thus, while the workpiece is totally restrained from axial motion, in the region where the workpiece enters or exits the clamp, a limited amount of bending is permitted, thus avoiding stress and possible damage to the workpiece.

5 Claims, 2 Drawing Figures

CLAMP FOR ELONGATED CYLINDRICAL WORKPIECE

BACKGROUND OF THE INVENTION (a) Field of the Invention

Broadly speaking, this invention relates to clamping. More particularly, in a preferred embodiment, this invention relates to methods and apparatus for clamping an elongated cylindrical workpiece, such as a hose or pipe.

(b) Discussion of the Prior Art

Clamps for retaining elongated cylindrical workpieces, for example hoses or pipes, are legion. Unfortunately, the prior art structures suffer from one or more deficiencies. Perhaps the most serious of these is the tendency of the pipe or hose to crack or shear at the point where it enters into or exits from the clamp. Depending upon the nature of the fluid carried by the pipe or hose, this cracking or complete failure can be disastrous and must obviously be avoided at all costs.

SUMMARY OF THE INVENTION

The problem, then, is to devise a clamp for a hose or pipe that will dampen any vibrations that might tend to occur in the pipe, firmly clamp the pipe to restrain the same from undesirable axial translation, yet at the same time reduce or eliminate any excess stresses that might be placed on the pipe as it enters or exits the clamp, thereby eliminating any tendency for the pipe to crack or shear.

These problems, and others, have been solved by the instant invention which, in a preferred embodiment, comprises an improved clamp for an elongated cylindrical workpiece, of the type which comprises a cylindrical, elastic member for placement about the workpiece to be clamped, and first and second, substantially identical, clamp members each having a semicylindrical recess for mating engagement about the elastic member, thereby to clamp the workpiece. The improvement in the above-described clamp comprises means for forcing only the central region of the elastic member into clamping engagement with the workpiece, thereby relieving stress on the workpiece as it enters or exits the clamp.

The invention, and its mode of operation, will be more fully understood from the following detailed description, when taken with the appended drawings, in which:

DETAILED DESCRIPTION OF THE INVENTION

Figure 2:
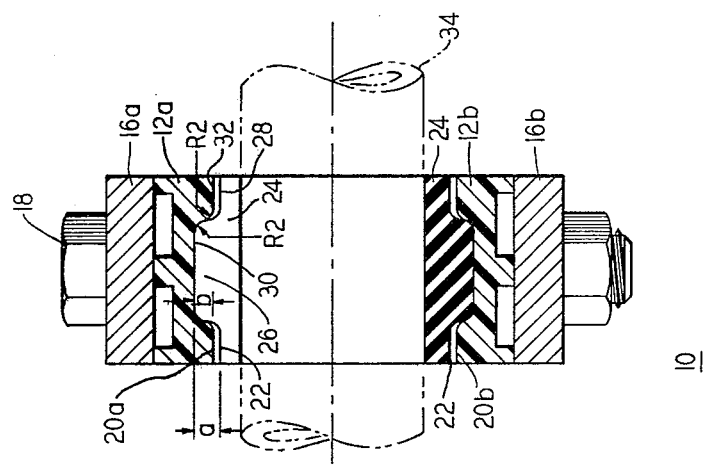
FIG. 2 is a partial cross-sectional view of the clamp shown in FIG. 1 taken about line 2—2.
Figure 1:
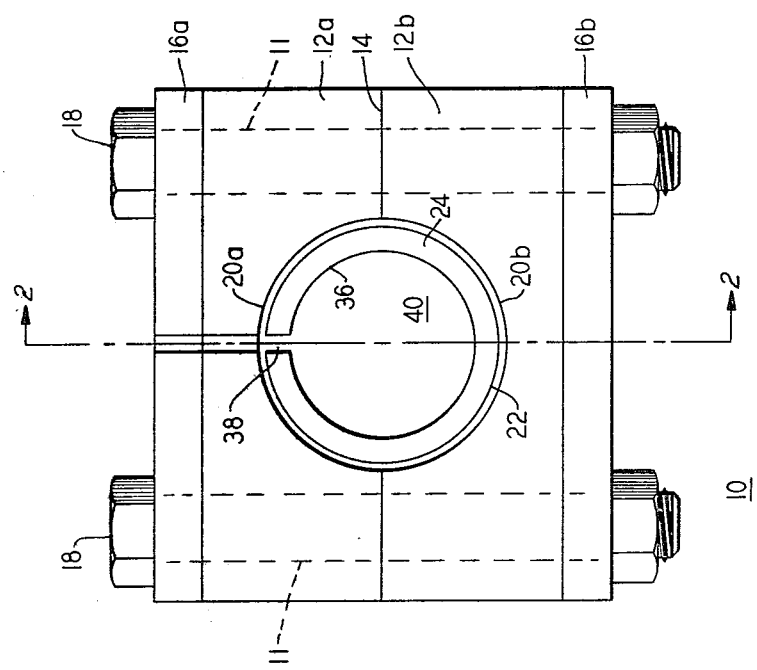
FIG. 1 is a front view of an illustrative clamp according to the invention.

As shown in FIGS. 1 and 2, clamping apparatus 10 comprises two, substantially identical clamping members 12a and 12b which advantageously are fabricated from a hard, plastic material, for example the material sold under the name Ultramid A4K. This material, which has a specific gravity of from 1.12 to 1.15, is particularly well suited to this kind of application because of its ability to dampen vibrations and shock, and to absorb noise. The lower surface of member 12a is configured for mating engagement with the upper surface of member 12b, thereby to form the interface 14, as shown. The upper surface of member 12a receives a rectangular metal clamping plate 16a while the lower surface of member 12b similarly receives a rectangular metal clamping plate 16b. The two halves of the clamping apparatus are held together by a pair of machine screws 18 which pass through a corresponding pair of vertical bores 11 which are formed in the two clamping members.

Clamp members 12a and 12b have a semi-circular, inner peripheral surface 20a and 20b respectively formed therein. Surfaces 20a and 20b interlock with the corresponding outer peripheral surface 22 of a hollow cylindrical insert 24, advantageously comprised of an elastic, flexible material such as rubber.

As seen best in FIG. 2, the inner peripheral surfaces 20a and 20b, and the outer peripheral surface 22, are configured such that, in the axial direction, the outer peripheral surface 22 of insert 24 has an elevated central region 26 and two recessed border regions 28. In like fashion, the inner peripheral surfaces 20a and 20b each have a depressed central region 30 and two elevated border regions 32. The height a of the elevated central region 26 of insert 24 is slightly larger than the height b of the depressed central region 30 in clamp members 12a and 12b.

The phantom lines in FIG. 2 are intended to represent a hose or pipe 34 which passes through clamp 10 in the axial direction. The pipe or hose will engage the inner surface 36 of insert 24 when the machine screws 18 are tightened to force the clamp members 12a and 12b into engagement, one with the other. To permit insert 24 to be fitted about pipe 34, prior to the assembly of clamp members 12a and 12b, the insert is provided with a longitudinally extending slit 38. Slit 38, of course, permits the insert to be spread-apart so that the insert may be pushed over and around pipe 34.

In operation, insert 24 is snapped over pipe 34, as above described, then the clamp members 12a and 12b are mated with the insert. The clamp plates 16a and 16b are then positioned as shown through the plates and clamp members to hold the clamp members in engagement with the pipe. When these machine screws are tightened, the depressed central regions 30 of members 12a and 12b will apply pressure to the elevated central region 26 of insert 24. This pressure will be applied through the insert to the pipe, firmly clamping the same in place. Importantly, because dimension b is slightly smaller than dimension a, machine screws 18 will not apply any pressure to the edges of rubber insert 24. Thus, border regions 28 and 32 serve only to lead the pipe into the clamp and do not themselves provide any direct clamping action.

Insert 24 is advantageously fabricated from a rubber having a Shore hardness of from 60–80, preferably from 60–70 Shore. Those skilled in the art will appreciate that insert 24 will tend to "flow" towards the border regions; thus, the force applied to the pipe will fall off gradually, rather than abruptly towards the edges of the clamp. This will eliminate any tendency for the pipe to rupture at the point where it enters into or exits from the clamp.

The above-described arrangement firmly restrains the pipe from axial displacement but, at the same time, permits a limited amount of motion in the region where the pipe enters and exits from the clamp. Thus, the natural bending radius of the hose or pipe is preserved.

By means of machine screws 18, or other suitable fastening means (not shown), the clamp and pipe may be secured to the wall or ceiling or to a pipe-hanger, etc., as desired.

Advantageously, the width of the elevated region 26 of insert 24 is the same, in the axial direction, as the sum of the widths of the two, non-elevated border regions on either side of the elevated region. The same is, thus, true of the width of the depressed regions in clamp members 12a and 12b.

Further, one skilled in the art will appreciate that the elevated region could be positioned equally well in the clamp members 12a and 12b. In that event, the corresponding depressed region would be formed in the elastic member 24. The net effect would be the same. Of course, it would still be necessary to insure that the height of the elevated region was greater than the height of the depressed region.

One skilled in the art may make various changes and substitutions to the layout of parts shown without departing from the spirit and scope of the invention.

What is claimed is:

1. An improved clamp for an elongated cylindrical workpiece, said clamp being of the type which comprises:
    a cylindrical, elastic member for placement about the workpiece to be clamped; and
    first and second substantially identical clamping members each having a semi-cylindrical recess for mating engagement about said elastic member, thereby to clamp said workpiece, wherein the improvement comprises:
    an elevated, axially-extending, central region in the outer peripheral surface of said elastic member; and
    a corresponding, depressed, axially-extending, central region in the inner peripheral surface of each of said clamping members, the radial height of said extended region being greater than the radial height of said depression thereby forming an axially-extending gap between said elastic member and said first and second clamping members, on both sides of said central regions whereby, whenever said first and second clamping members are urged together to clamp said workpiece, the elevated central region of said elastic member is compressed, causing said central region to flow elastically in both directions into said axially extending gaps thus establishing a pressure gradient in said workpiece that steadily decreases in both directions, away from said central regions.

2. The improved clamp according to claim 1 wherein said elastic insert is comprised of rubber.

3. The improved clamp according to claim 2 wherein said rubber has a hardness of from 60 to 80 Shore, and preferably from 60-70 Shore.

4. The improved clamp according to claim 3 wherein said rubber insert includes an axially-extending slit to facilitate spreading of said insert and the resultant placement thereof about said workpiece.

5. The improved clamp according to claim 4 wherein said elevated region extends in the axial direction an amount substantially equal to the sum of the non-elevated border regions on either side thereof.

* * * * *